United States Patent [19]

Muto

[11] Patent Number: 5,469,137
[45] Date of Patent: Nov. 21, 1995

[54] DIGITAL/ANALOG INDICATION UNIT

[75] Inventor: Masanori Muto, Shizuoka, Japan

[73] Assignee: Yazaki Corporation, Tokyo, Japan

[21] Appl. No.: 115,059

[22] Filed: Sep. 2, 1993

[30] Foreign Application Priority Data

Sep. 4, 1992 [JP] Japan .................................. 4-237172
May 14, 1993 [JP] Japan .................................. 5-112993

[51] Int. Cl.⁶ ....................................................... G09F 9/35
[52] U.S. Cl. ........................... 340/462; 340/441; 340/525
[58] Field of Search ................................. 340/525, 441,
340/461, 462, 870.02, 870.23, 870.05, 459;
345/5, 7, 35, 36; 364/426.02, 426.05, 565,
710.01; 324/99 D, 115, 142; 368/71

[56] References Cited

U.S. PATENT DOCUMENTS

| | | | |
|---|---|---|---|
| 4,012,948 | 3/1977 | Kano et al. | 73/113 |
| 4,250,572 | 2/1981 | Yoshida | 368/71 |
| 4,371,864 | 2/1983 | Kawasaki et al. | 340/441 |
| 4,392,216 | 7/1983 | Tsuji | 368/76 |
| 4,584,527 | 4/1986 | Amigo | 340/870.02 |
| 4,711,034 | 12/1987 | Koizumi | 33/832 |
| 5,136,516 | 8/1992 | Twombly | 364/426.05 |

FOREIGN PATENT DOCUMENTS

| | | |
|---|---|---|
| 3119215A1 | 2/1982 | Germany . |
| 3638569A1 | 5/1987 | Germany . |
| 3640452A1 | 9/1988 | Germany . |
| 3714072A1 | 11/1988 | Germany . |
| 3907002A1 | 8/1990 | Germany . |
| 3837592A1 | 10/1990 | Germany . |
| 4126148A1 | 2/1992 | Germany . |
| 4125724A1 | 6/1992 | Germany . |
| 0067536 | 4/1983 | Japan ................................ 340/441 |
| 0033051 | 2/1985 | Japan ................................ 340/462 |

*Primary Examiner*—John K. Peng
*Assistant Examiner*—Daniel J. Wu
*Attorney, Agent, or Firm*—Finnegan, Henderson, Farabow, Garrett & Dunner

[57] ABSTRACT

A digital/analog indication unit which is capable of performing both digital and analog indications of detected value such as vehicle speed or the like, respectively by displaying numerals and rotating an indication needle to a scale, wherein there is no discrepancy between the digital indication and analog indication. The digital/analog indication unit of the present invention includes; a digital indicator having a display device for indicating numerals corresponding to a detected value, an analog indicator having a dial plate with scales provided on the surface thereof, an indication needle, and a pulse motor connected to the indication needle, wherein the indication needle is rotated by the pulse motor to point to one of the scales, and an indication control means which updates the numerals displayed by the digital indicator in accordance with a newly detected value, and activates the pulse motor following the updating operation of the digital indicator to rotate the indication needle to point to a scale of the analog indicator, the scale corresponding to the updated indication of the digital indicator.

2 Claims, 6 Drawing Sheets

FIG. 1

SPEED SIGNAL

T1 : GATE OPEN TIME
T2 : TIME FOR CALCULATION
T : TIME REQUIRED FOR UPDATE

DIGITAL/ANALOG INDICATION UNIT

BACKGROUND OF THE INVENTION

1. Field of the Invention

The present invention relates to a digital/analog indication unit which is capable of performing both digital and analog indications of a detected value such as vehicle speed or the like, respectively by displaying numerals and rotating an indication needle on a scale.

2. Description of the Invention

Conventional systems include a so-called head-up display device for indicating driving information such as vehicle speed or the like, wherein an indicated image is projected within the visual field of the driver or the nearby area thereof in order to improve the visibility of the projected image even in a vehicle in motion.

For example, conventional system may include a device in which an image, which is indicated by an indicator such as a fluorescent display tube or the like, is projected first to a windshield or to a trans-reflective mirror disposed on a dashboard and thereafter reflected therefrom towards the driver's visual point, so that the driver can visibly observe the illuminated image of the vehicle speed or the like superimposed on the external view within the visual field of the windshield.

There has also been provided another type of vehicle indication unit in which an image such as vehicle speed displayed by an indicator is reflected by a reflecting mirror or the like provided at the lower side of the windshield, so that the reflected image is observed at the nearby region of the windshield.

An indicator for use with such heads-up display devices should preferably be a light-emitting type, so that the current speed can be immediately recognized, and for this reason, there have been proposed many digital indicators such as a fluorescent display tube or the like which are capable of displaying numerals by light-emitting segments.

With the digital indication as disclosed above, since the resolving power thereof is settled per each 1 Km/h the precision of measurement is determined by the precision of the clock pulse within a digital activation circuit+a(Km/h), and the hysteresis for suppressing the flickering of indication+b(Km/h) is provided, then the indication error is made to be+a+b(Km/h) as a result.

On the other hand, an analog-type indicator having an indication needle and a dial plate is often used for a speedometer disposed at an instrument panel. This analog-type indicator has conventionally been provided with an ammeter, a cross-coil or the like as an activator for rotating the indication needle and the activator is activated by an analog or digital circuit or by a combination thereof.

Since there are differences in factors and levels of error between a digital indicator used for a head-up display device and an analog indicator provided at the position of an instrument panel, and there is a difference between the activation circuits thereof, it has been difficult to reduce the mutual discrepancy in the indications therebetween.

SUMMARY OF THE INVENTION

The present invention eliminates the problems described above, and it is an object of the present invention to provide a digital/analog indication unit which is capable of reducing the discrepancy in indication made by a digital indicator and that made by an analog indicator.

A digital/analog indication unit according to the present invention is constructed such that it includes; a digital indicator having a display device for indicating numerals corresponding to a detected value, an analog indicator having a scale plate with scales provided on the surface thereof, an indication needle, and a pulse motor connected to the indication needle, wherein the indication needle is rotated by the pulse motor to point to one of the scales, and an indication control means which updates the numerals displayed by the digital indicator in accordance with detected values, and activates the pulse motor following the updating operation of the digital indicator to rotate the indication needle to point to a scale of the analog indicator, which scale corresponding to the updated indication of the digital indicator.

In a digital/analog indication unit according to the present invention, the indication of the digital indicator is updated in accordance with a measured or detected value, and an analog indicator following the updated value of the digital indication, activates an indication needle to point to a scale which corresponds to the thus updated indication of the digital indicator. Since the indication needle of the analog indicator is activated by a pulse motor corresponding to a calculation performed based on the same detected data as the one used by the digital indicator, the indication needle can be precisely pointed and stopped at a desired scale, so that the indications made by the digital indicator and analog indicator can coincide with each other.

The above and other objects, features and advantages of the invention will become apparent from the following description and the appended claims, taken in conjunction with accompanying drawings which show by way of example preferred embodiments of the invention.

DESCRIPTION OF THE PREFERRED EMBODIMENTS

In the following, several embodiments of the present invention are described with reference to the accompanying drawings.

Figure 1:
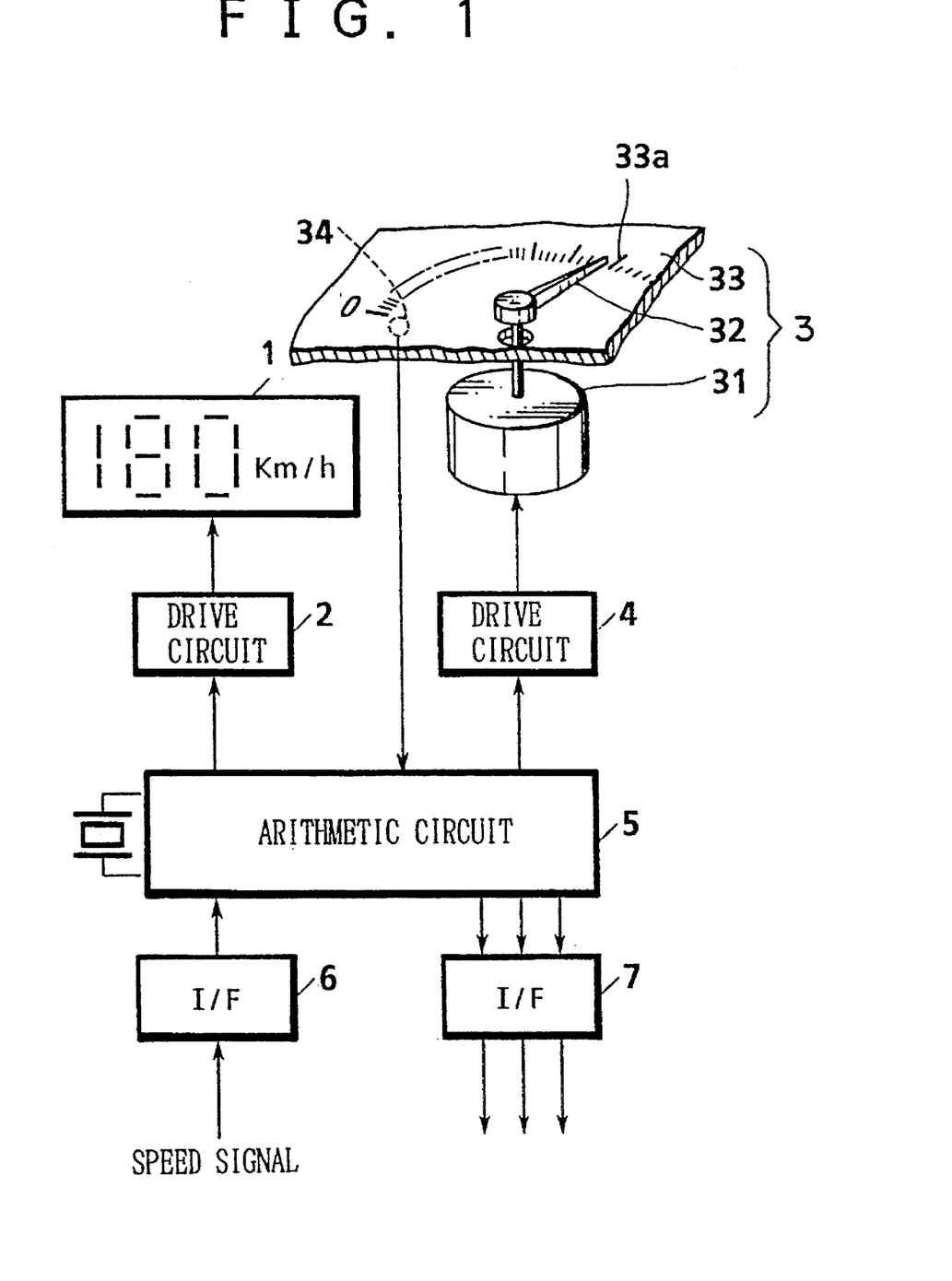
FIG. 1 is an illustration showing a digital/analog indication unit of the present invention.

FIG. 1 is an illustration showing a digital/analog indication unit according to the present invention, which forms a speedometer of a vehicle, wherein a digital indication for a heads-up display and an analog indication are executed by use of an indication needle located at the instrument panel.

In the figure, reference numeral 1 denotes a digital indicator composed of a 3-unit 7-segment device such as a fluorescent display tube and a liquid crystal display (LCD) for displaying numerals reference, numeral 2 denotes a drive circuit for activating the digital indicator 1, so that the digital indicator 1 displays the vehicle speed at 1 Km/h unit reference numeral, 3 denotes an analog indicator which further comprises a pulse motor having a reduction gear 31 (hereinafter referred to just as a pulse motor 31), an indication needle 32 activated by the pulse motor, and a dial plate 33 having scales 33a thereon. The analog indicator 3 is activated to perform an analog indication in such a way that the indication needle 32 activated by the pulse motor 31 is rotated to point to one of the scales 33a. Reference numeral 34 denotes an indication needle detector disposed at the back surface of the dial plate 33 at the scale of 0 Km/h for detecting the sharp end of the indication needle 32 by a non-contact method. In a preferable method for detecting the indication needle, a magnet is provided at the back surface of the sharp end of the indication needle, and a magnet sensor is provided at the back surface of the dial plate at the scale of 0 Km/h, whereby the magnet sensor can sense the magnet and detects the indication needle. Further, reference numeral 4 denotes a drive circuit for activating the pulse motor 31 of the analog indicator, numeral 5 denotes an arithmetic circuit including, for example, a microcomputer. Reference numeral 6 denotes an interface circuit for accepting a speed signal outputted from a speed sensor (not shown) into the arithmetic circuit 5, and reference numeral 7 denotes another interface circuit for outputting a signal to a speed alarm device or the like (not shown) on the basis of the vehicle speed detected at the arithmetic circuit 5. It is to be noted that the speed signal is formed as a rectangular pulse with a pulse duty ratio of 50% whose pulse cycle is inversely proportional to the vehicle speed.

Figure 3:
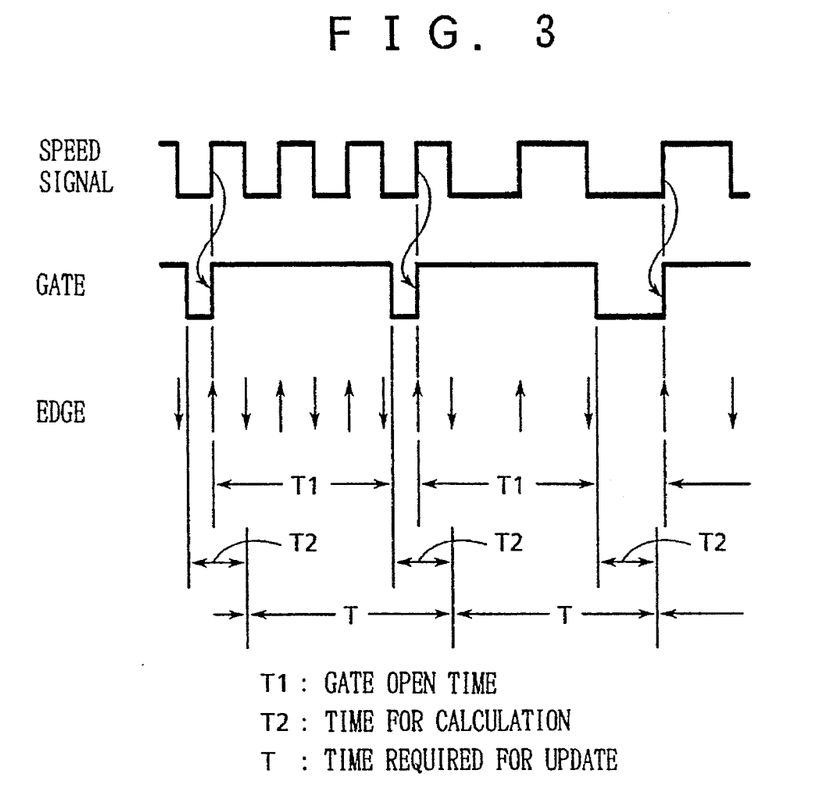
FIG. 3 is an explanatory view showing the gate method adopted in the present invention.

The vehicle speedometer adopted in the present invention detects a vehicle speed by a so-called gate method, wherein as shown in FIG. 3, the gate is first opened in synchronization with either a rising edge or a trailing edge of an input pulse of the speed signal in order to count up the number of edges of the pulses, and the gate is closed when a predetermined period of gate-open time T1 has lapsed. Further, the thus closed gate is opened again in synchronization with an edge immediately after the closing of the gate to count up the edges of the pulses during the predetermined time T1.

Therefore, each time the predetermined period of gate-open time T1 has passed and the gate is closed, a calculation is performed based on the counted number of the edges to obtain the vehicle speed (hereinafter referred to as "indication speed") and indications of the digital indicator 1 and the analog indicator 3 are updated based on the thus obtained vehicle speed. In other words, a calculation time T2 is provided after the lapse of the gate-open time T1, and a period between the ending point of the calculation time T2 and the ending point of the next calculation time T2 is made to be a time T required for an update of indication T.

It is to be noted that the time span of the gate-open time T1 is determined to be a time required to count for only two pulses of a speed signal when the vehicle speed is 1 Km/h. For example, when the vehicle speed is 60 Km/h, the number of revolution of the vehicle speed sensor is 637 rpm. If one revolution contains 40 pulses, the speed 1 Km/h corresponds to 7.08 Hz of pulse frequency.

In the described embodiment, since the gate-open time T1 is settled such that it includes only two pulses when the vehicle speed is 1 Km/h, the gate-open time T1 is 282.6 msec. In this case, twice as many pulses of the speed signal counted during the gate-open time T1 is n of n Km/h. Thus, none count of the rising (or trailing) edge of the speed signal corresponds to 0.5 Km/h.

The process conducted during a calculation time T2 will now be described below. In the present embodiment, the number of edges of the speed signal currently counted (hereinafter referred to just as "counted number") is compared with the number of edges previously counted, wherein if the difference between them is within +1 count (that is, +0.5 Km/h), the counted number of this time is not updated as a new data to be indicated, and is disposed as a hysteresis. In other words, if the difference between them is more than +2 count (that is, more than 1 Km/h), then the indicated vehicle speed is changed in accordance with the counted number of this time, whereas the indicated vehicle speed is not changed if the difference is less than 1 (that is, 1 Km/h), the indicated vehicle speed is not changed.

Figure 4:
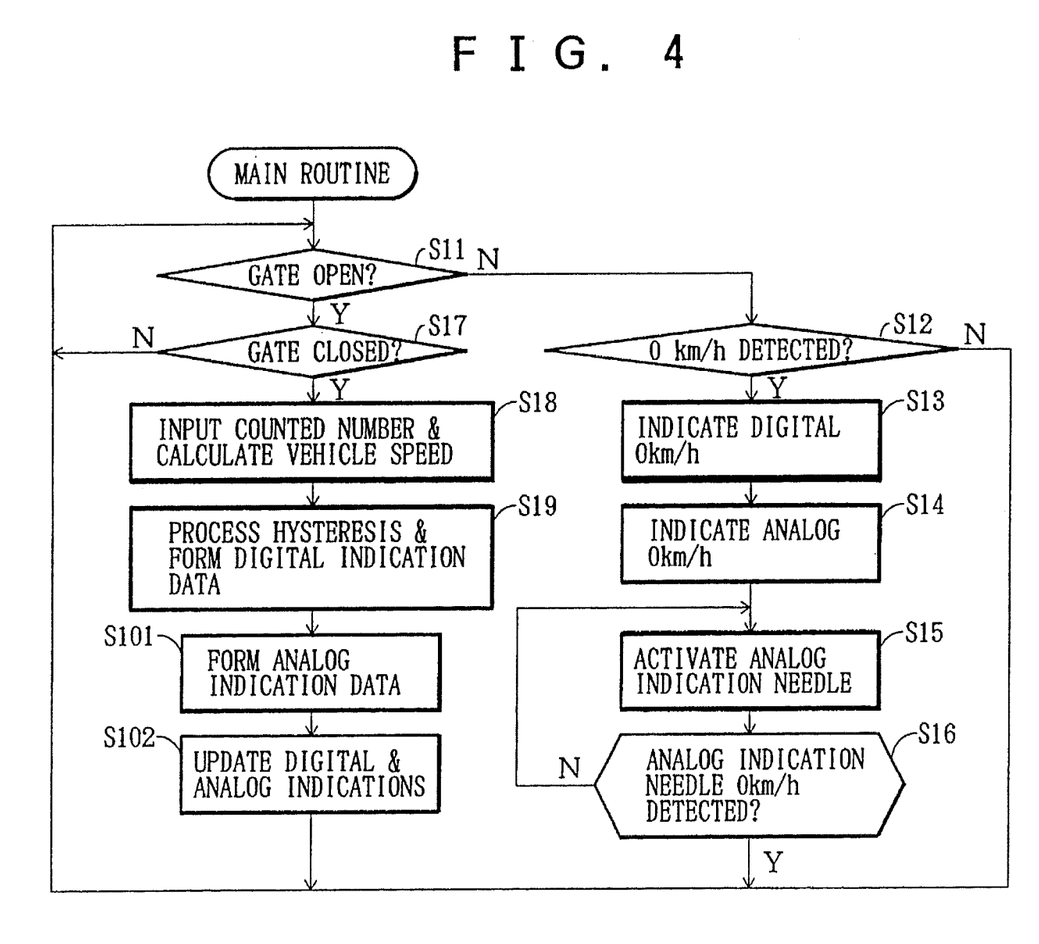
FIG. 4 is a flow chart of the main routine performed in the present invention.
Figure 5:
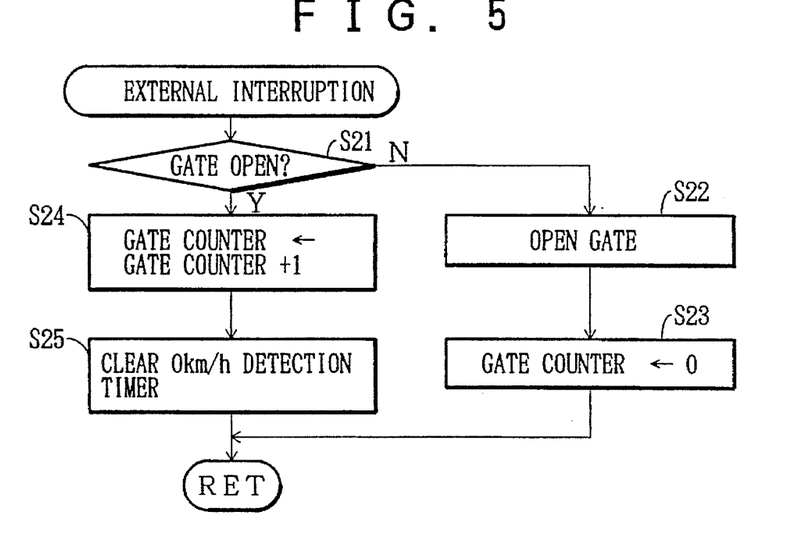
FIG. 5 is a flow chart showing an external interruption performed in the present invention.
Figure 6:
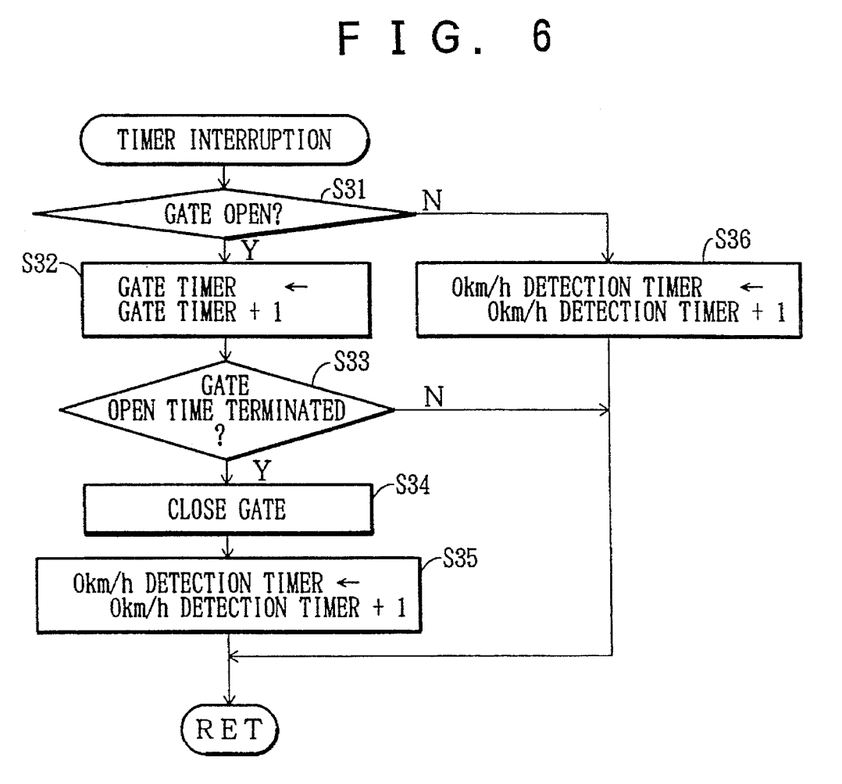
FIG. 6 is a flow chart showing a timer interruption performed in the present invention.

FIG. 4 is a flow chart of the main routine performed by the arithmetic circuit 5 in the present invention. FIG. 5 shows a flow chart showing an external interruption performed at each rising or trailing edge of the speed signal detected. FIG. 6 describes a flow chart showing a timer interruption performed at a shorter cycle than the cycle of the speed signal.

It should be noted that the above embodiment adopts a gate counter for counting the number of edges of the speed signal, a 0 Km/h detection timer for measuring the timer during which the gate is shut to further detect 0 Km/h, and a gate timer for measuring the time during which the gate is opened.

First of all, in the external interruption as shown in FIG. 5, it is determined whether or not the gate is open at step S21, wherein if the gate is not open, it is opened at step S22 and the gate counter is set to 0 at step S23, and thereafter the procedure returns to the original routine. On the other hand, if it is detected that the gate is already open at step S21, the gate counter is incremented by "1" at step S24, and the 0 Km/h detection timer is set to 0 at step S25. Therefore the procedure returns to the original routine.

By the procedures as explained above, when a (rising or trailing) edge of the speed signal is detected, the gate is opened, and during the period the gate is open, the number of edges is counted by the gate counter. Further, when the edge is detected, the 0 Km/h detection timer is always set to 0.

In the procedure of an external timer interruption as shown in FIG. 6, it is first determined whether or not the gate is open at step S31, and if the gate is open, the gate timer is incremented by "1" at step S32. Therefore, it is further determined whether or not the gate open time T1 is terminated in accordance with the value of the gate timer at step S33. Here, if the gate open time is not terminated yet, the procedure returns to the original routine, but if it is already terminated, the gate is closed at step S34, and the 0 Km/h detection timer is incremented by "1" at step S35. Therefore, the procedure returns to the original routine. On the other hand, if it is determined that the gate is not open at step S31, the 0 Km/h detection timer is incremented by "1" at step S36, and thereafter the procedure returns to the original routine.

By the procedures as explained above, when the gate open time has lapsed since the moment that the gate is opened, the gate is closed. Further, during the time in which the gate is closed, the 0 Km/h detection timer is updated, and the period of time during which the gate is closed is counted.

In the main procedure disclosed in FIG. 4, it is determined whether or not the gate is open at step S11, and if it is not open, it is further determined whether or not the 0 Km/h is detected at step S12 depending on whether the 0 Km/h detection timer has become a predetermined value. If the 0 Km/h is not detected, the procedure returns to step S11. If the 0 Km/h is detected at step S12, 0 Km/h is indicated on the digital indicator at step S13, and thereafter the same 0 Km/h is indicated on the analog indicator at step S14 by such a procedure as determining the number of activation pulses of the pulse motor 31. Thereafter, the activation pulse is outputted to the pulse motor 31 to rotate the indication needle at step S15, and it is determined whether or not the 0 Km/h indication of the analog indicator is detected by the indication needle detector 34 at step S16, wherein if the 0 Km/h indication is not detected, the procedure returns to step S15, or otherwise the procedure returns to step S11.

On the other hand, if it is detected that the gate is open at step S11, then it is determined whether or not the gate is closed after a predetermined time lapse at step S17. If the gate is not closed yet, the procedure returns to step S11, whereas the procedure advances to step S18 if the gate is closed. The following are the procedures after step S18. At step S18, the vehicle speed is calculated based on the counted number summed up at the gate counter, at step S19, the hysteresis is processed to form a digital indication data. At step S101, an analog indication data is formed by, e.g., determining the number of activation pulses of the pulse motor 31, and at step S102, the indications shown by the digital indicator and the analog indicator are updated respectively. Therefore the procedure returns to step S11.

By the procedures as explained above, when a predetermined time has lapsed after the gate-closed state is detected, the 0 Km/h is detected, so that 0 Km/h is indicated by the digital indicator and the analog indicator, whereas when it is detected that the open gate is closed, the vehicle speed is indicated by the digital indicator and the analog indicator based on the counted number of the speed signal summed up so far. Thus, the arithmetic circuit 5 calculates the indication speed on the basis of the speed signal fed thereto by way of the interface circuit 6. Therefore the thus calculated indication speed data is further fed to the drive circuit 2 to proceed digital indication by the digital indicator 1, and simultaneously the calculated indication speed data is further fed to the drive circuit 4 to proceed analog indication by the analog indicator 3.

It should be noted that the indication on the analog indicator 3 is controlled by the arithmetic circuit 5 so that since the relationship between the rotation angle of the indication needle 32 in the analog indicator 3 and the number of activation pulses fed to the pulse motor 31 is predetermined by a formula, the arithmetic circuit 5 calculates the number of activation pulses of the pulse motor 31 based on this formula to rotate the indication needle 32 for a required angle.

In other words, the arithmetic circuit 5 calculates the above number of activation pulses necessary for rotating the indication needle 32 to a required angle in a shorter period of time than the gate-open time T1 (i.e., approximately 50 msec shorter than 282.6 msec. which is the gate-open time T1). In a detailed explanation, the number of activation pulses is first counted by the counter, and by either incrementing or decrementing the thus counted value depending on whether the vehicle speed is increasing or reducing, the location of the indication needle 32 is obtained on the basis of the 0 Km/h point. The rotating direction of the pulse motor 31 can also be determined based on the thus obtained location of the indication needle corresponding to the vehicle speed and the current location thereof.

The arithmetic circuit 5 activates the pulse motor 31 by way of the drive circuit 4 based on the above number of activation pulses, output speed of the activation pulses and data regarding the rotating direction to rotate the analog indication. In other words, when an indication by the digital indicator 1 is updated, an analog indication by the analog indicator 3 is also updated before the indication updating time T has lapsed.

Figure 2:
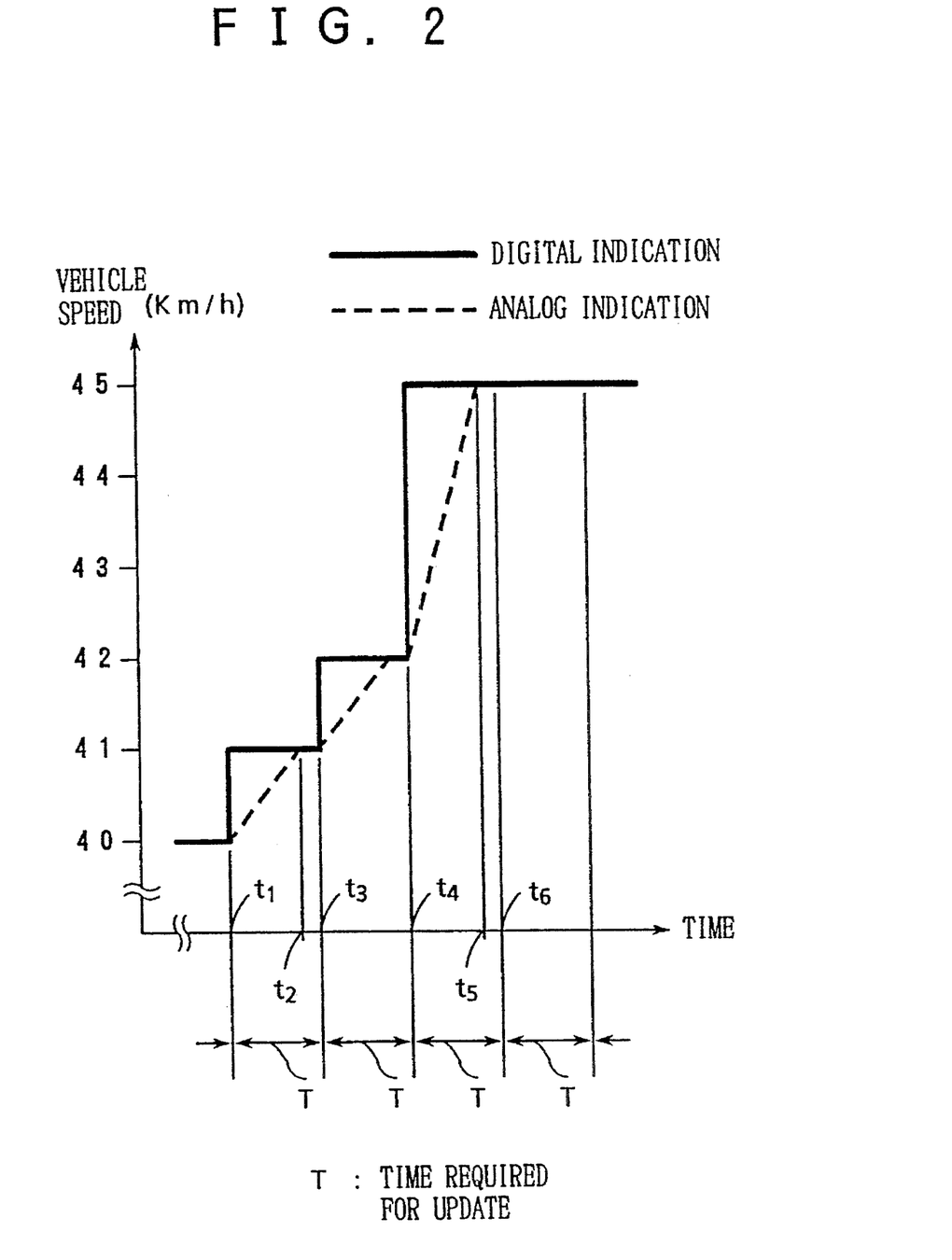
FIG. 2 is an explanatory view showing the relationship among the digital indication, analog indication and the time required for updating the indication.

FIG. 2 is an illustration showing one example of the variation of the indications by the digital indicator 1 and by the analog indicator 3, wherein a solid line shows the value in digital indication, while a dashed line shows the vehicle speed corresponding to the location of the indication needle in analog indication. As shown in the same figure, if the digital indication is updated from "40 Km/h" to "41 Km/h" at the digital indication updating time t1, the location of the indication needle 32 is changed to indicate "41 Km/h" at the time t2 which is before the digital indication updating time t3 starts. Further, if the digital indication is updated from "42 Km/h" to "45 Km/h" at the digital indication updating time t4, the location indication needle 32 is changed its location to indicate "45 Km/h" at the time t5 which is before the digital indication updating time t6 starts, whereby the analog indication always follows the digital indication, and thereby both indications coincide with each other as a result.

Figure 7:
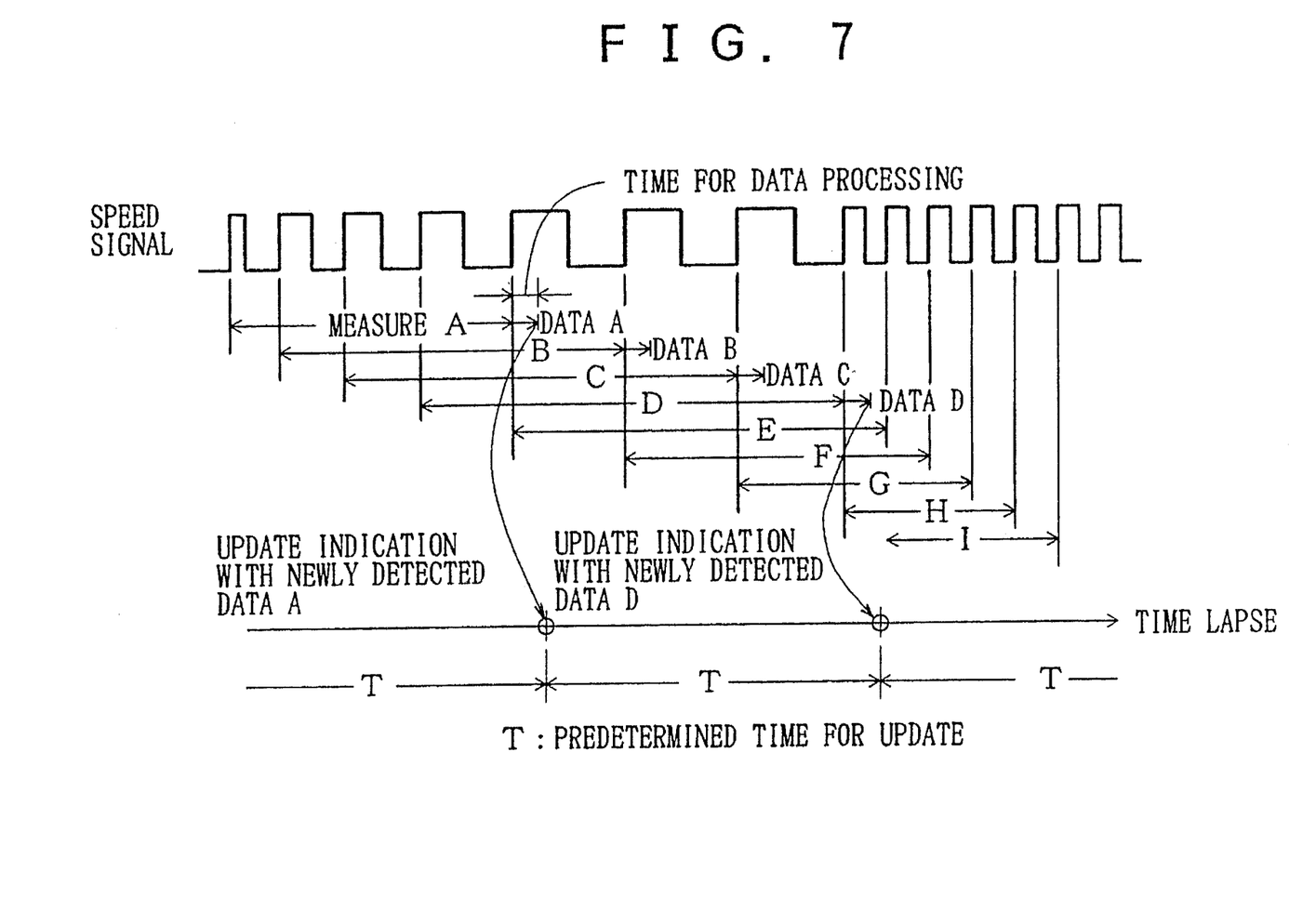
FIG. 7 is an illustration showing an example in which a cycle-measuring method is applied to the digital/analog indication unit of the present invention.
Figure 8:
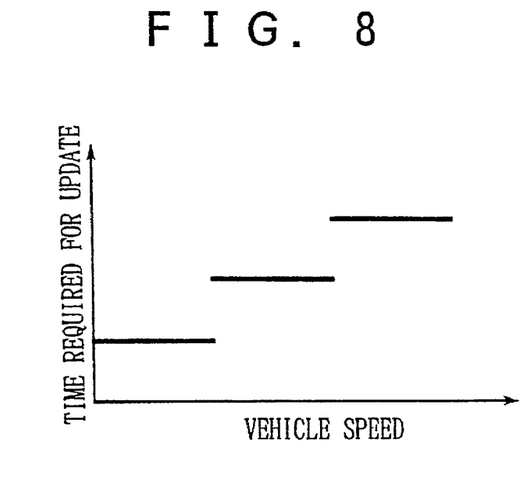
FIG. 8 is an illustration showing an example of the setting of time required for an update of indication when a cycle-measuring method is applied to the device of the present invention.

It is to be noted that although in the above embodiment the vehicle speed is detected by the gate method, it can be detected by so-called a cycle-measuring method. In the cycle-measuring method, the time required for counting a predetermined number of pulses of the speed signal is first calculated as shown in FIG. 7, and then the vehicle speed is detected from a cycle of the pulse. Thus, the timing for detecting the indication speed varies in accordance with the vehicle speed. Therefore, if a predetermined updating time T is settled as shown in FIG. 7, and the digital indication is updated in accordance with the indication updating time T as the embodiment disclosed above, and also analog indication is updated in accordance with this, the control of the pulse motor is readily performed in the same manner as the above embodiment, so that digital and analog indications can be synchronized with each other. By the way, in the case of the cycle-measuring method as explained above, the indication updating time T also can be variably settled at several steps within the full scale of the vehicle speed, and the indication updating time T is selected based on the detected vehicle speed. By controlling the cycle or the like of the activation pulse in accordance with the thus selected indication updating time, the speed for updating the analog indication can be varied in accordance with the timing of the vehicle speed detection.

Although the invention has been described in its preferred form with a certain degree of particularity, for example, the above embodiment is applied to a speedometer in which a vehicle speed is the value to be measured, obviously many changes and variations are possible therein. It is therefore to be understood that the invention may be practiced otherwise than as specifically described herein without departing from the spirit and scope thereof.

What is claimed is:

1. A digital/analog indication unit for indicating continuously changing vehicle speed comprising:

a digital indicator having a display means for indicating numerals corresponding to a first detected value received from a vehicle speed sensor;

an analog indicator having a dial plate with scales provided on the surface thereof, an indication needle, and a pulse motor connected to said indication needle, wherein said indication needle is rotated by said pulse motor to point to one of said scales; and indication control means for performing a continuous updating operation to provide an updated indication of the numerals displayed by said digital indicator in accordance with a second detected value received from the sensor, and for activating said pulse motor following the updating operation of said digital indicator to rotate said indication needle to point to a scale of said analog indicator, said scale corresponding to said updated indication of said digital indicator.

2. A digital/analog indication unit as claimed in claim 1, wherein said indication control means includes means for calculating a number of pulses to be fed to said pulse motor to rotate said indication needle of the analog indicator for a required angle in accordance with said updated indication of said digital indicator.

* * * * *